Patented Dec. 2, 1947

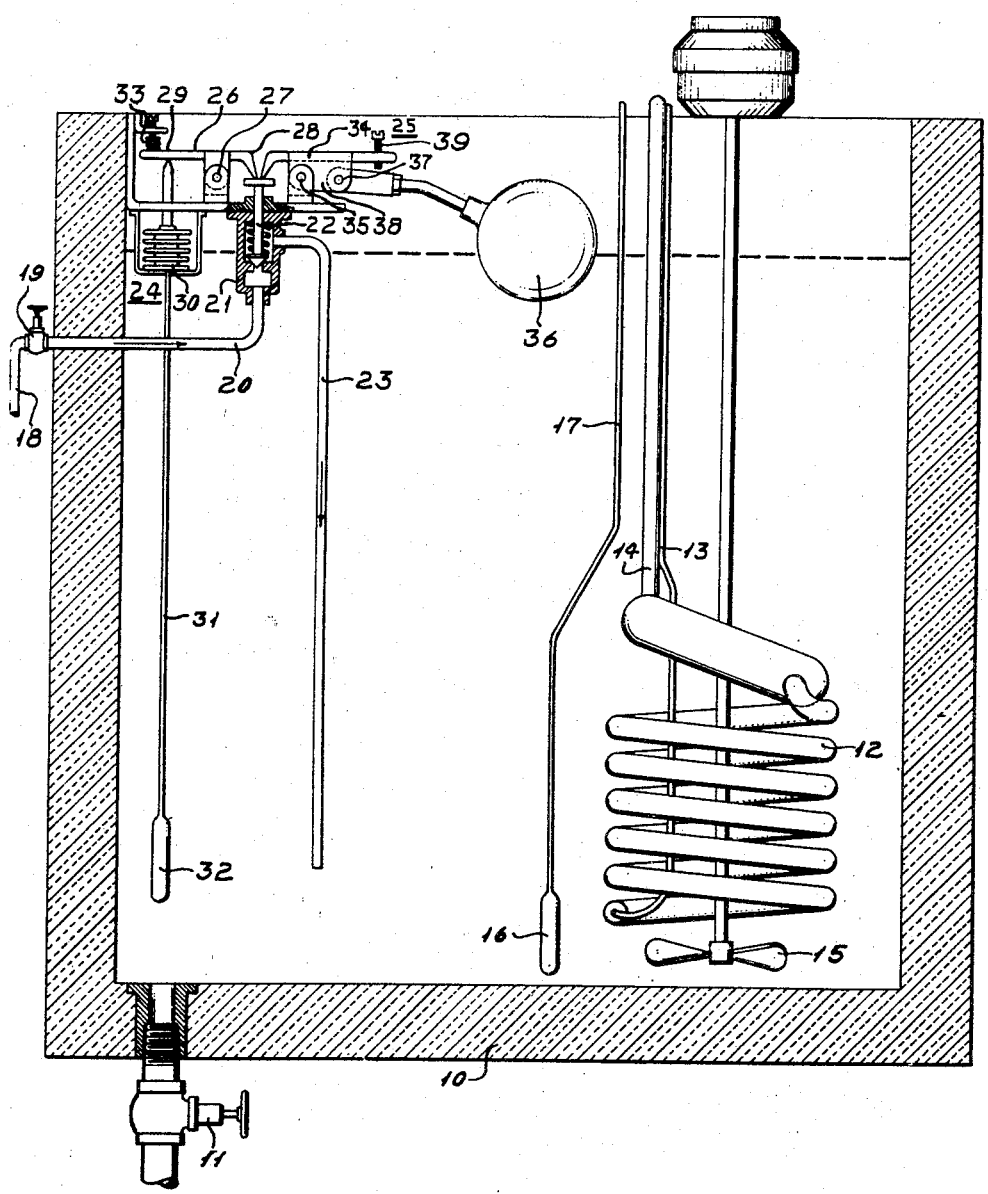

2,431,721

UNITED STATES PATENT OFFICE 2,431,721

TEMPERATURE AND LIQUID LEVEL CONTROL FOR REFRIGERATION APPARATUS

Woodrow W. Wiseman and Gordon K. Terry, Springfield, Mass., assignors to Westinghouse Electric Corporation, East Pittsburgh, Pa., a corporation of Pennsylvania Application November 21, 1945, Serial No. 629,952

3 Claims. (Cl. 62—7)

1

This invention relates to refrigerating apparatus and more particularly to such apparatus as used for cooling liquids to predetermined temperatures.

In liquid cooling apparatus as used, for example, in the cooling and storing of drinking water, which water is to be dispensed at a constant temperature, the irregular demands upon the system, together with the fact that the system is expected to produce a satisfactory beverage whether the temperature of the incoming water be 60° F. or 100° F., and whether the temperature of the room in which the cooler is placed be between the same limits or even higher, have made necessary a compromise in the refrigerating capacity of the cooling unit between that which is adequate to cool and maintain the body of cooled water at the desired dispensing temperature during "peak" conditions, when the demand for water is almost constant and the room and incoming water temperatures are high, and that when the demand and the room and incoming water temperatures are more nearly normal.

This problem is accentuated in that type of water cooling system where the incoming water is admitted to the cooling and storage tank from a source under pressure, such as the ordinary city water line, through a float or other level controlled valve, for in such a case the level in the storage tank falls rapidly at times of peak draw with the result that the incoming water enters in such volume that it is insufficiently cooled before it is used for beverage purposes unless the cooling unit be inordinately large in relation to the normal demands of the system.

Our invention, therefore, has as an object the provision of a system wherein the cooling unit is designed to take care of the system under normal conditions of operation but in which the amount of incoming water never exceeds the capacity of the cooling unit to reduce it to the selected dispensing temperature.

The invention further contemplates the provision of temperature-responsive means associated with level control means for controlling the ingress of make-up water to the storage tank in accordance with the capacity of the refrigerating unit.

A more specific object is to provide a single valve mechanism operated in response either to the temperature or the level of the stored water for controlling the flow of water into the storage tank.

These and other objects are affected by the invention as will be apparent from the following description and claims taken in connection with the accompanying drawings, forming a part of this application, in which:

The single figure is a partially diagrammatic view in vertical section of a liquid cooling apparatus embodying the invention.

The insulated tank 10 for containing the liquid to be dispensed is provided with an outlet valve 11 through which the cooled liquid is withdrawn. The liquid can be any liquid which it is desired be withdrawn from the storage tank at a predetermined temperature, and for simplicity of description will be hereafter referred to as drinking water or simply water.

The water in the tank 10 is cooled by a refrigerant cooling unit, here shown as a coil 12, to which liquid refrigerant is fed by a small conduit 13 and from which expanded refrigerant is withdrawn through a suction conduit 14. Conduits 13 and 14 are, of course, connected to a suitable refrigerant condensing unit (not shown). Preferably the cooling unit is placed near the bottom of the storage tank and it is also preferable to provide a motor-driven agitator 15 for circulating the water in the tank to assist in maintaining a uniform temperature. The refrigerating unit is stopped and started in response to the temperature of the stored water, a thermostatic bulb for that purpose being indicated at 16 and connected by a tube 17 to a suitable temperature-responsive switch (not shown). For drinking water purposes, the switch may be set to open when the water temperature falls to 34° F. and to close when the temperature rises to 39° F.

Water is supplied to tank 10 from a suitable source under pressure through a conduit 18. A pressure-regulating valve 19 is preferably provided in conduit 18, and a conduit 20 leads from the regulating valve to a valve body 21. Water passage through the valve body 21 is controlled by a reciprocating valve member 22 and water flows from the valve body to the tank 10 through a conduit 23.

The valve member 22 is controlled by either or both of two separate mechanisms, the temperature-responsive mechanism 24 and the liquid level responsive mechanism 25. The temperature-responsive mechanism, here shown somewhat diagrammatically, comprises a lever 26, pivoted at 27, having one end 28 disposed to engage the upper end of valve member 22 and having its opposite end 29 so disposed as to be influenced by a bellows 30, which bellows is connected by a tube 31 to a liquid or gas-filled bulb 32. The bulb 32 is preferably placed near the bottom of tank 10 so as to be influenced by the temperature of the water first to be dispensed. A spring-and-screw adjustment 33 is provided to control the temperature at which the bellows 30 becomes effective to bias the lever 26 about its pivot.

The liquid level control comprises a lever 34 pivotally mounted, as at 35. A float 36 is pivotally attached, at 37, to a flange 38 depending from lever 34, this pivot 37 being disposed between the pivot 35 and the end of the lever 34 nearest the float. A screw 39 threaded in that end of the lever may be adjusted to regulate the position at which the float will be effective to seat valve member 22.

The pivoted connection 37 of the float 36 with lever 34 ensures that the float will not influence the valve member until substantially the desired liquid level has been reached in tank 10. Thereby, the member 22 is operated solely under influence of the temperature-responsive mechanism 24 until the desired liquid level has been reached. Thus, when the water in the tank reaches the desired maximum temperature, say 39° F., the temperature-responsive mechanism 24 will rotate lever 26 clockwise to seat valve member 22 so that no more water can enter the tank, even though the level be low, until the stored water has been cooled to some predetermined temperature, say 34° F. On the other hand, no water can enter the tank when the float has reached its predetermined high level, regardless of the water temperature.

It will be seen from the foregoing description that the invention provides a simple and effective system, including a single valve assembly, for maintaining a body of cooled water or other liquid between desired temperature limits.

While the invention has been shown in but one form, it will be obvious to those skilled in the art that it is not so limited, but is susceptible of various changes and modifications without departing from the spirit thereof.

What is claimed is:

1. In apparatus of the type wherein liquid is stored in a tank and is cooled therein by a refrigerating unit, and from which tank the cooled liquid is periodically withdrawn, and in which the liquid is supplied to the tank from a source under pressure under control of a single valve means, the combination with said single valve means, of means responsive to the temperature of the liquid in the tank for controlling said valve means, and means responsive to the level of the liquid in the tank for also controlling said valve means.

2. In apparatus of the type wherein liquid is stored in a tank and is cooled therein by a refrigerating unit, and from which tank the cooled liquid is periodically withdrawn, and in which the liquid is supplied to the tank from a source under pressure under control of a single valve means, the combination with said single valve means, of means responsive to the temperature of the liquid in the tank for controlling said valve means, and means responsive to the level of the liquid in the tank for also controlling said valve means, said liquid level control means being so constructed and arranged as not to influence said valve means until a predetermined high liquid level has been reached.

3. In apparatus of the type wherein liquid is stored in a tank and is cooled therein by a refrigerating unit, and from which tank the cooled liquid is periodically withdrawn, and in which the liquid is supplied to the tank from a source under pressure under control of a single valve means, the combination with said single valve means, of means responsive to the temperature of the liquid in the tank for controlling said valve means, and means responsive to the level of the liquid in the tank for also controlling said valve means, said temperature-responsive means and said liquid level control means being independently adjustable to vary the position at which they influence said valve means.

WOODROW W. WISEMAN.
GORDON K. TERRY.

REFERENCES CITED

The following references are of record in the file of this patent:

UNITED STATES PATENTS

| Number | Name | Date |
|---|---|---|
| 2,346,259 | Hutchings | Apr. 11, 1944 |